(12) United States Patent
Mikhailov et al.

(10) Patent No.: US 9,798,047 B2
(45) Date of Patent: Oct. 24, 2017

(54) DEVICE FOR APPLYING LIGHT TO AN INNER SURFACE OF A CYLINDER AND BEAM TRANSFORMATION DEVICE FOR SUCH A DEVICE

(71) Applicant: LIMO Patentverwaltung GmbH & Co. KG, Dortmund (DE)

(72) Inventors: Aleksei Mikhailov, Dortmund (DE); Vitalij Lissotschenko, Froendenberg (DE)

(73) Assignee: LIMO PATENTVERWALTUNG GmbH & Co. KG, Dortmund (DE)

( * ) Notice: Subject to any disclaimer, the term of this patent is extended or adjusted under 35 U.S.C. 154(b) by 44 days.

(21) Appl. No.: 14/436,589

(22) PCT Filed: Oct. 14, 2013

(86) PCT No.: PCT/EP2013/071391
§ 371 (c)(1),
(2) Date: Apr. 17, 2015

(87) PCT Pub. No.: WO2014/060337
PCT Pub. Date: Apr. 24, 2014

(65) Prior Publication Data
US 2015/0301235 A1    Oct. 22, 2015

(30) Foreign Application Priority Data
Oct. 18, 2012    (DE) .......................... 10 2012 109 937

(51) Int. Cl.
*G02B 27/10*    (2006.01)
*G02B 3/00*    (2006.01)
(Continued)

(52) U.S. Cl.
CPC ........ *G02B 3/0037* (2013.01); *B23K 26/0734* (2013.01); *B23K 26/106* (2013.01);
(Continued)

(58) Field of Classification Search
USPC .......................................................... 359/619
See application file for complete search history.

(56) References Cited

U.S. PATENT DOCUMENTS

| 4,551,628 A | 11/1985 | Grossman |
| 5,109,465 A | 4/1992 | Klopotek |

(Continued)

FOREIGN PATENT DOCUMENTS

| DE | 4115562 | 2/1992 |
| DE | 102007035717 | 7/2008 |

(Continued)

OTHER PUBLICATIONS

International Search Report for counterpart application PCT/EP2013/071391, dated Feb. 28, 2014, (10 pages).

*Primary Examiner* — Jack Dinh
(74) *Attorney, Agent, or Firm* — Cohen & Hildebrand, PLLC (57) ABSTRACT

A device (1) for applying light (4) to an inner surface (2) of a cylinder (3), comprising a homogenizer (14), into which light (4) can enter and from which the light (4) can exit, wherein the homogenizer (14) has a cylindrical internal surface (15), on which the light (4) can be reflected after entering and before exiting, and also comprising ways for introducing light (4) into the homogenizing means (14), and focusing arrangements, which can focus light (4) exiting from the homogenizer (14) onto the inner surface (2) of the cylinder (3) to which light (4) is to be applied.

1 Claim, 10 Drawing Sheets

(51) Int. Cl.
*B23K 26/073* (2006.01)
*G02B 27/09* (2006.01)
*B23K 26/10* (2006.01)

(52) U.S. Cl.
CPC ......... *G02B 3/005* (2013.01); *G02B 27/0927* (2013.01); *G02B 27/0961* (2013.01); *G02B 27/0966* (2013.01); *G02B 27/0994* (2013.01)

(56) References Cited

U.S. PATENT DOCUMENTS

| | | |
|---|---|---|
| 5,179,260 A | 1/1993 | Kroehnert |
| 2005/0077276 A1 | 4/2005 | Chen |
| 2005/0105189 A1 | 5/2005 | Mikhailov |
| 2005/0134965 A1 | 6/2005 | Poulsen |
| 2007/0007529 A1 | 1/2007 | Takemura |
| 2009/0294417 A1 | 12/2009 | Spennemann |
| 2013/0271830 A1 | 10/2013 | Mikhailov |

FOREIGN PATENT DOCUMENTS

| | | |
|---|---|---|
| DE | 102010053781 | 6/2012 |
| EP | 0282593 | 9/1988 |
| EP | 1508397 | 2/2005 |
| JP | H0247221 | 2/1990 |
| JP | H06262384 | 9/1994 |
| JP | 2005313191 | 11/2005 |
| WO | 9104829 | 4/1991 |
| WO | 2005070610 A1 | 8/2005 |

Fig. 22

DEVICE FOR APPLYING LIGHT TO AN INNER SURFACE OF A CYLINDER AND BEAM TRANSFORMATION DEVICE FOR SUCH A DEVICE

This is an application filed under 35 USC §371 of PCT/EP2013/071391 filed on Oct. 14, 2013 claiming priority to DE 10 2012 109 937.5 filed on Oct. 18, 2012.

BACKGROUND OF THE INVENTION

The present invention relates to a device for applying light to an inner surface of a cylinder and to a beam transformation device that is particularly suitable for such a device.

Definitions: The terms light or illumination or laser radiation are not intended to be limited to the visible spectral range of the light. Rather, the terms light or illumination or laser radiation in the context of this application are used for electromagnetic radiation over the entire wavelength range from FIR to the XUV. Propagation direction of the laser beam or the light refers to an average propagation direction of the laser radiation or light, in particular when this is not a plane wave or is at least partially divergent. Laser beam, light beam, sub-beam or beam may refer not only to an idealized beam of geometrical optics, but also to a real light beam, such as a laser beam having a Gaussian profile or a modified Gaussian profile, such as a super-Gaussian profile or a top hat profile, which does not have an infinitesimally small beam cross-section, but rather an extended beam cross-section.

BRIEF SUMMARY OF THE INVENTION

For example, the aforementioned device can be used to selectively apply a circular intensity distribution of laser light to the inside of a tube, in order to process this inside. For example, the inside of a tube can be successively annealed with an intensity distribution traveling in the longitudinal direction of the tube. In this way, for example, a coating on the inside of the tube can be treated.

It is the object of the present invention to provide a device of the aforementioned type which is capable of producing on the inside of the cylinder onto with light is to be applied a circular focus area with the greatest possible homogeneity, wherein the focus range should in particular be as thin as possible. Furthermore, a beam transformation device is to be provided which is suitable for such a device.

This is achieved with a beam transformation device according to claim 1 or claim 2 and with a device for applying light to an inside of a cylinder according to claim 4. The dependent claims relate to preferred embodiments according to the invention.

According to claim 1, it is provided that the beam transformation device includes a plurality of cylindrical lens arrays which are arranged annularly adjacent to one another and which each have cylindrical lenses whose cylinder axes are aligned at an angle of 45° relative to the radial direction of the annular arrangement. Such a beam transformation device can rotate the unit vectors of the sub-beams of the light passing through the beam transformation device by 90° and/or cause a rotation of the azimuth angle of a light beam passing through the beam transformation device by 90°.

According to claim 2, it is provided that the beam transformation device includes at least one first cylindrical lens array having a plurality of cylindrical lenses whose cylinder axes extend in a first direction, wherein light to be transformed can pass through the first cylindrical lens array, and at least one second cylindrical lens array having a plurality of cylindrical lenses, whose cylinder axes extend in a second direction, wherein light exiting the first cylindrical lens array can pass through the second cylindrical lens array, and wherein the first direction encloses an angle of 45° with the second direction. Such a beam transformation device can rotate the unit vectors of the sub-beams of light passing through the beam transformation device light by 90° or cause the azimuth angle of a light beam passing through the beam transformation device the light beam to be rotated by 90°.

According to claim 4, it is provided that the device includes homogenizing means, into which light can enter and from which light can exit again, wherein the homogenizing means has a cylindrical inner surface at which the light can be reflected after entering and prior to exiting, means for introducing light into the homogenizing means, and focusing means configured to focus light exiting the homogenizing means on the inside of the cylinder to which the light is be applied. The homogenizing means can attain a homogeneous intensity distribution of the light on the inside of the cylinder.

It may be provided that the homogenizing means are formed as a hollow cylinder, whereby in particular the inner jacket surface of the hollow cylinder is designed to be reflective. With this configuration, light propagating through the hollow cylinder can be homogenized due to multiple reflections.

It may be provided that the inner jacket surface of the hollow cylinder is patterned. This patterning ensures good homogenization of the circular focus area on the inside of the cylinder. It may be provided that the patterning is arranged on the inner jacket surface as a reflective array of hollow cylinder sections. In cross-section, a reflective array of circular arcs is curled into a circle. Such a pattern is thus similar to a flat array of cylindrical lenses commonly used for homogenizing light.

It is possible to use, instead of a hollow cylinder, an in particular solid light guide as homogenizing means. In this solid light guide, the light can also be homogenized by multiple internal reflections.

It may be provided that the focusing means are formed as lens means, in particular as a toroidal lens means, or as mirror means, in particular as a toroidal mirror means, or include a lens means, in particular a toroidal lens means, and/or a mirror means, in particular a toroidal mirror means. Such focusing means can ensure a circular focus area on the inside of the cylinder with a comparatively small line width.

It is possible that the device comprises a beam transformation device which is arranged upstream of the homogenizing means so that the light can enter the homogenizing means after passing through the beam transformation device. In particular, the beam transformation device can be a beam transformation device according to claim 1 or claim 2. The rotation of the unit vectors or of the azimuth angle of the light by 90° caused by such a beam transformation device, adds a sagittal component to the light that enhances the homogenization effect of the homogenizing means.

It may be provided that the device includes beam expansion means that expand and/or shape the light prior to entering the beam transformation device and/or the homogenizing means such that the beam cross-section of light has off-center an intensity maximum or several intensity maxima. Such a measure can simplify focusing to a circular focus area on the inside of the cylinder.

Further features and advantages of the present invention will become apparent from the following description of preferred exemplary embodiments with reference to the accompanying drawings, which show in:

DETAILED DESCRIPTION OF THE INVENTION

In the figures, identical or functionally identical parts or light beams are provided with the same reference symbols.

Figure 1:
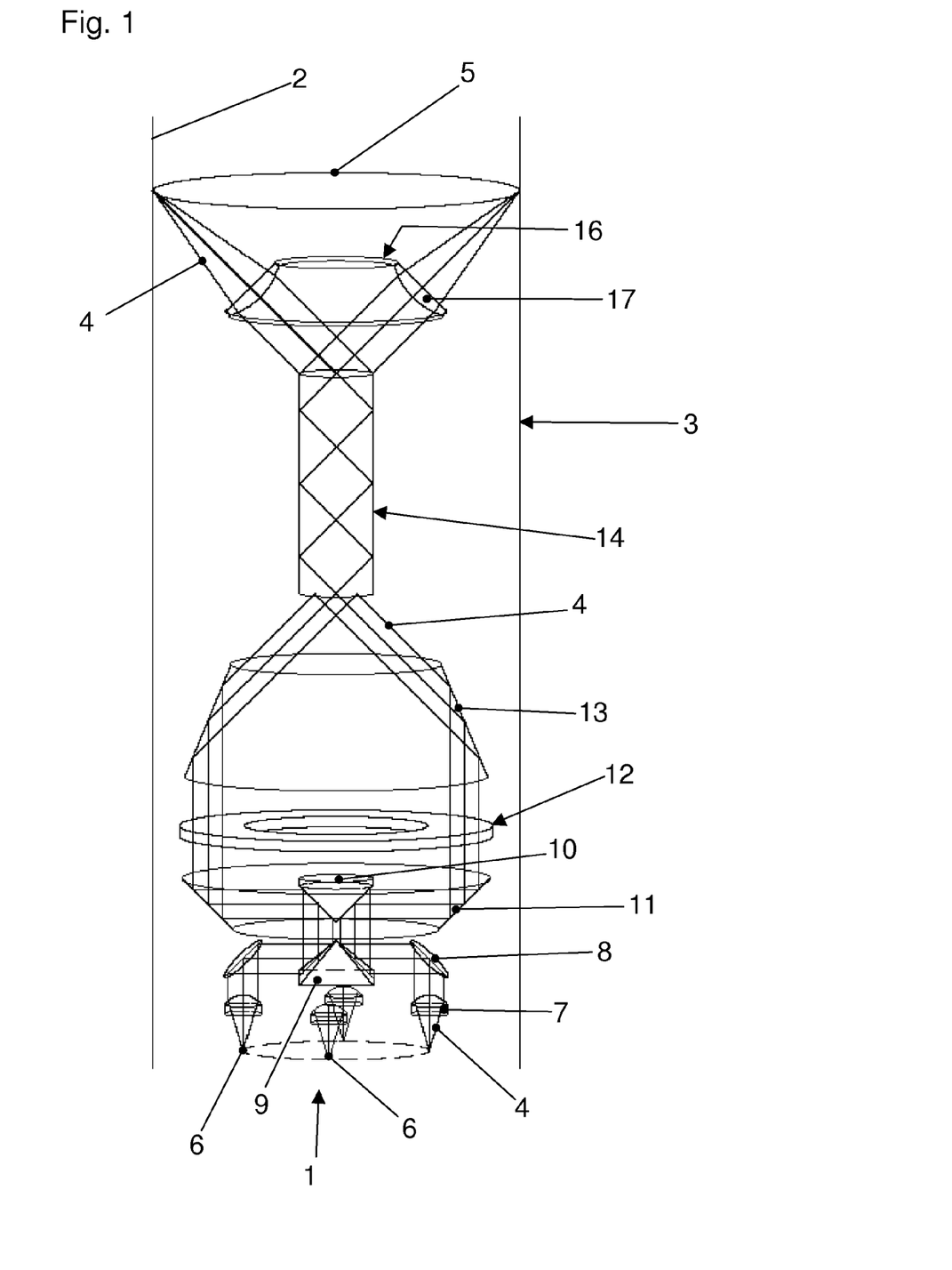
FIG. 1 a schematic side view of a first embodiment of a device according to the invention.

The embodiment of a device 1 according to the invention depicted in FIG. 1 is used for applying light 4 to an inner surface 2 of a schematically illustrated cylinder 3. In particular, a circular focus area 5 is to be formed with the device 1 according to the invention on the inner surface 2 of the cylinder 3. The device 1 is in the illustrated embodiment located inside the cylinder 3.

Figure 17:
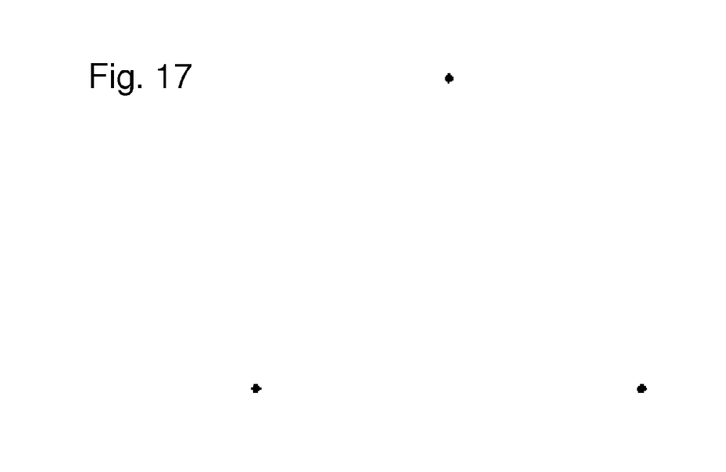
FIG. 17 a schematic crass-section through the light in the region of the light sources when using three light sources.
Figure 18:
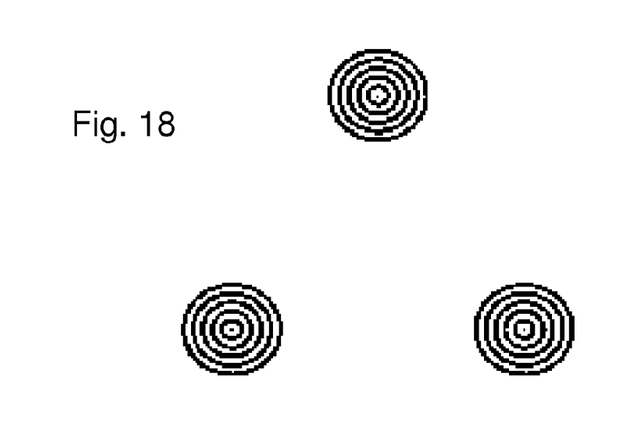
FIG. 18 a schematic cross-section through the light after the collimator means.
Figure 19:
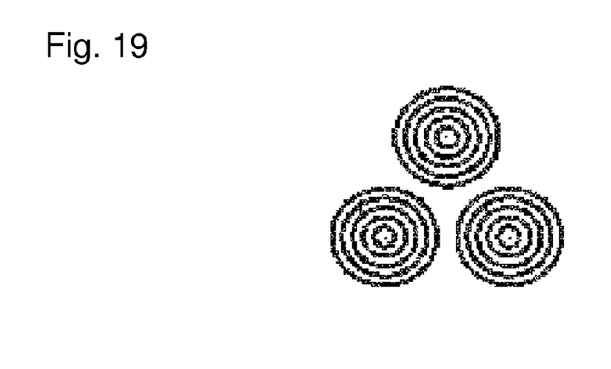
FIG. 19 a schematic cross-section through the light after the compressing means.

In the illustrated embodiment, the device 1 includes four light sources 6 which may, for example, be the ends of optical fibers, wherein laser light can be coupled into the optical fibers. The light 4 emanating from the light sources 6 (see exemplary distribution with three light sources in FIG. 17) is collimated by collimating means 7 (see exemplary distribution with three light sources in FIG. 18) and reflected by mirrors 8 onto compressing means 9, wherein the compressing means 9 are realized by a reflective four-sided pyramid. FIG. 19 shows an exemplary distribution for three light sources downstream of the compressing means 9.

The device further includes a cone 10 with a reflective outer surface onto which the compressed light 4 is reflected by the pyramid. Starting from this cone 10, the light 4 is directed radially outwards onto the reflective inner surface of a hollow cone 11 where the light is reflected upwardly in FIG. 1, so that the light 4 now propagates again in the axial direction of the cylinder 3.

Figure 20:
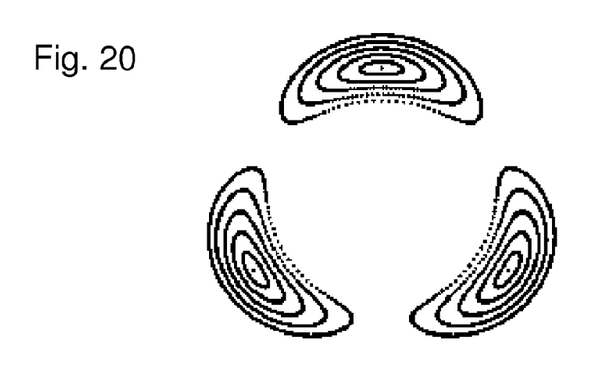
FIG. 20 a schematic cross-section through the light upstream of the beam transforming means.

The cone 10 with the reflective outer surface and the hollow cone 11 with the reflective inner surface together form beam expansion means configured to expand and shape the light 4 so that the beam cross-section of the light has off-center an intensity maximum or several intensity maxima. In this context, see the exemplary distribution with three light sources in FIG. 20.

A first embodiment of a beam transformation device 12 according to the invention is arranged downstream of the hollow cone 11 in the propagation direction of the light 4. The beam transformation device 12 is shown again in more detail in FIG. 9.

Figure 9:
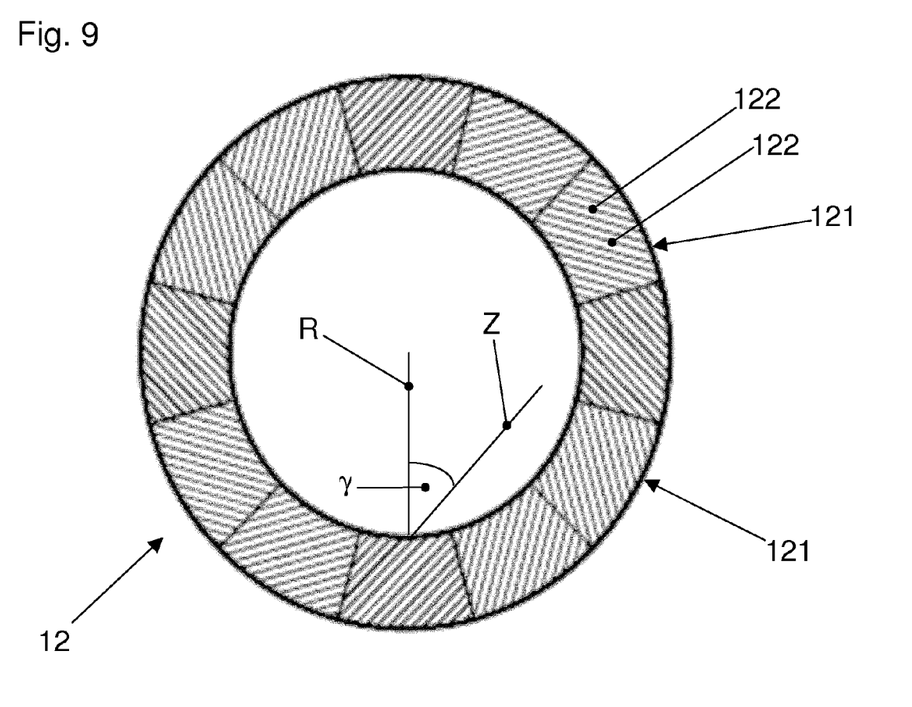
FIG. 9 a schematic side view of a first embodiment of a beam transformation device according to the invention.

The beam transformation device 12 includes a plurality of cylindrical lens arrays 121, each having a plurality of cylindrical lenses 122. The individual cylindrical lens arrays 121 are arranged in a ring. Each of the cylinder axes Z of the cylindrical lenses 122 is oriented approximately at an angle γ of 45° relative to the radial direction R of the ring.

The individual cylindrical lenses 122 are formed, for example, as biconvex lenses with a convex surface on the entrance side and a convex surface on the exit side of the beam transformation device 12. Here, the mutual distance of these two convex surfaces to each other corresponds in particular to the sum of the focal lengths of these two convex surfaces or to twice the focal lengths of the convex surfaces if the focal lengths are equal. Each of the cylindrical lenses 122 then forms a Kepler telescope.

Figure 7:
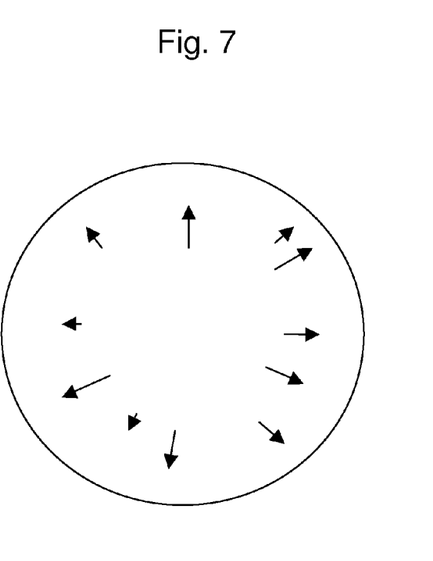
FIG. 7 a schematic view showing the unit vectors of light in a projection onto a plane perpendicular to the mean direction of light propagation prior to entering in the beam transformation device.
Figure 8:
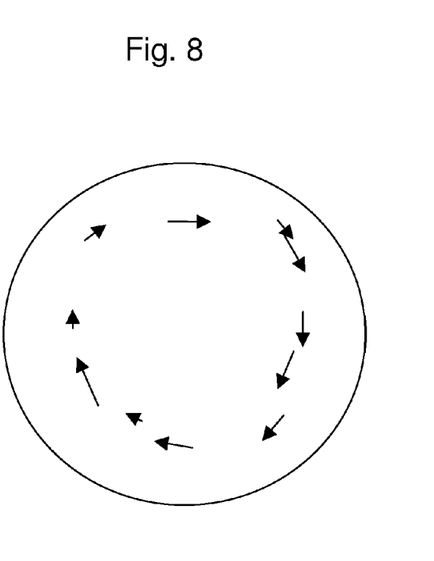
FIG. 8 a schematic view showing the unit vectors of light in a projection onto a plane perpendicular to the mean direction of light propagation after exiting from the beam transformation device.

FIG. 7 and FIG. 8 each show respective schematic views illustrating the unit vectors of sub-beams of the light 4 in a projection onto a plane perpendicular to the mean direction of propagation of the light 4 before entering into and after exiting from the beam transformation means 12. As can be seen, the unit vectors are rotated by 90° by the cylindrical lenses that are oriented at an angle of 45° relative to the radial direction.

Figure 3:
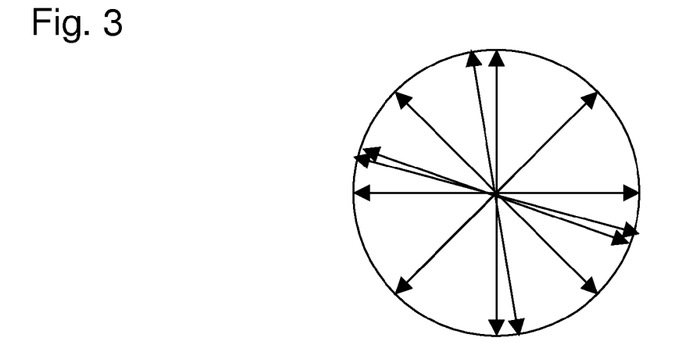
FIG. 3 a distribution of beam trajectories typical for meridional rays in a projection onto a plane perpendicular to the cylinder axis of the homogenizing means.
Figure 4:
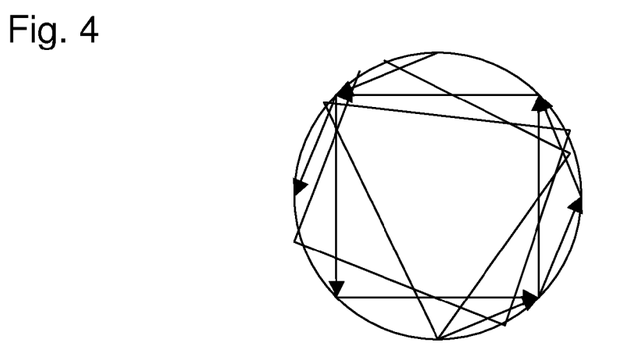
FIG. 4 a distribution of beam trajectories typical for sagittal rays in a projection onto a plane perpendicular to the cylinder axis of the homogenizing means.
Figure 5:
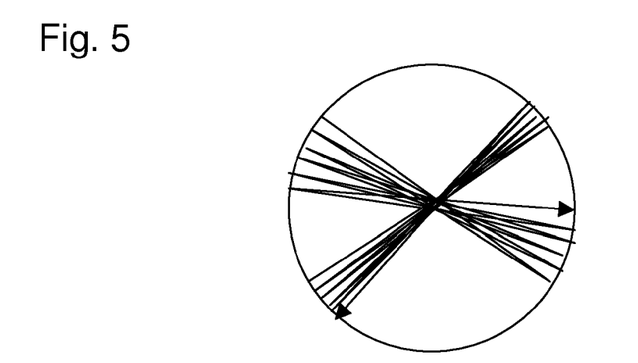
FIG. 5 a distribution of beam trajectories typical for the embodiments shown in FIG. 1 and FIG. 2 in a projection onto a plane perpendicular to the cylinder axis of the homogenizing means.

This adds a sagittal component to the previously collimated sub-beams of the light 4. FIG. 3 to FIG. 5 illustrate this relationship. FIG. 3 to FIG. 5 show distributions of beam trajectories in a projection onto a plane perpendicular to the cylindrical axis of a cylindrical medium in which the light propagates. FIG. 3 illustrates a distribution typical for meridional rays and FIG. 4 shows a distribution of beam trajectories typical for sagittal rays.

The sub-beams of the light 4 have for full collimation essentially only a meridional component. When passing through the beam transformation device 12, a sagittal component is added to the sub-beams of the light 4. Such distribution having a sagittal component is shown in FIG. 5.

Another hollow cone 13 with a reflective inner surface is arranged in the propagation direction of light 4 downstream of the beam transformation device 12. The light 4 is reflected at the inner surface of the hollow cone 13 toward a homogenizing means 14, as shown schematically in FIG. 6.

The homogenizing means 14 is constructed as a hollow cylinder with a reflective, patterned inner surface 15. The patterns of the inner surface 15 are concave cylinder sections with cylinder axes extending parallel to the cylinder axis of the hollow cylinder. The concave cylinder sections are arranged consecutively in the circumferential direction of the hollow cylinder. The homogenizing means 14 can be significantly longer than shown in the schematic diagram of FIG. 6.

The light 4 is homogenized in the homogenizing means 14 by multiple reflections on the inner surface 15 so as to produce substantially the same intensity along the entire circular focus area 5. The homogenization is enhanced by admixing to the light 4 with the beam transformation device 12 a sagittal component, as described with reference to FIG. 3 to FIG. 5.

Figure 21:
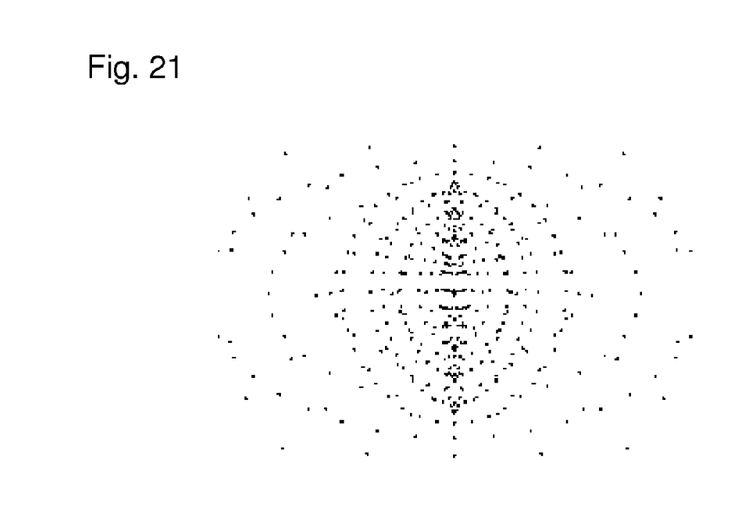
FIG. 21 an exemplary local intensity distribution of the light on the inside of the cylinder to which light is to be applied, in the event that no beam transformation device is used.
Figure 22:
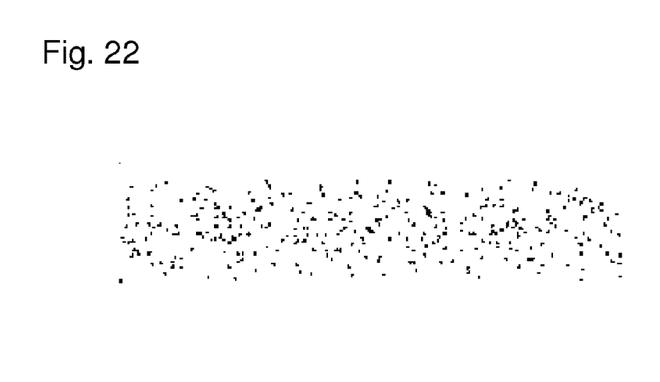
FIG. 22 an exemplary local intensity distribution of the light on the inside of the cylinder to which light is to be applied, in the event that a beam transformation device according to the invention is used.
Figure 23:
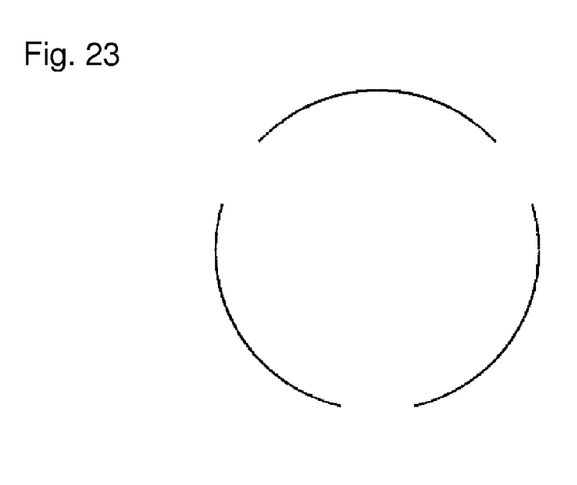
FIG. 23 an overall intensity distribution of the light on the inside of the cylinder to which light is to be applied, in the event that no homogenizing means are used.
Figure 24:
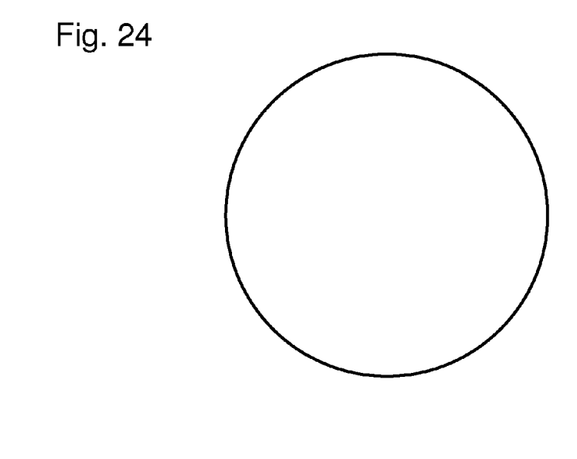
FIG. 24 an overall intensity distribution of the light on the inside of the cylinder to which light is to be applied, in the event that homogenizing means are used.

FIG. 21 illustrates how low the homogeneity is without the beam transformation device 12. In contrast, FIG. 22 shows a very homogeneous distribution of the light 4 across the circular focus area 5. FIG. 23 shows how low the homogeneity is without the homogenizing means 14. In contrast, FIG. 24 shows a very homogeneous distribution of the light 4 across the circular focus area 5.

Figure 6:
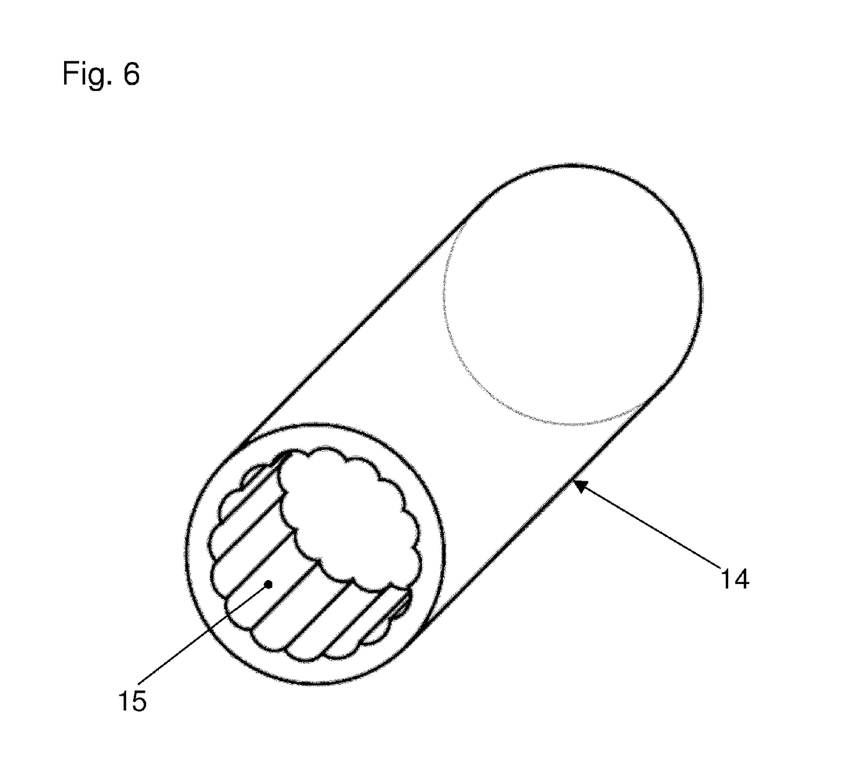
FIG. 6 a perspective view of a homogenizing means.

The patterning of the homogenizing means 14 also ensures good homogenization of the circular focus area 5 on the inner surface 2 of the cylinder 3.

The light 4 exiting from the homogenizing means 14 is focused by a lens means acting as a focusing means 16 onto the inner surface 2 of the cylinder 3 onto which light 4 is to be applied. The lens means 16 is formed in particular as a toroidal lens means 16 producing a circular focus area 5 on the inner surface 2 of the cylinder 3. The toroidal lens means 16 includes a peripheral torus-shaped outer surface 17, by which the light 4 is refracted such that the light 4 is focused on the inner surface 2 of the cylinder 3.

Figure 2:
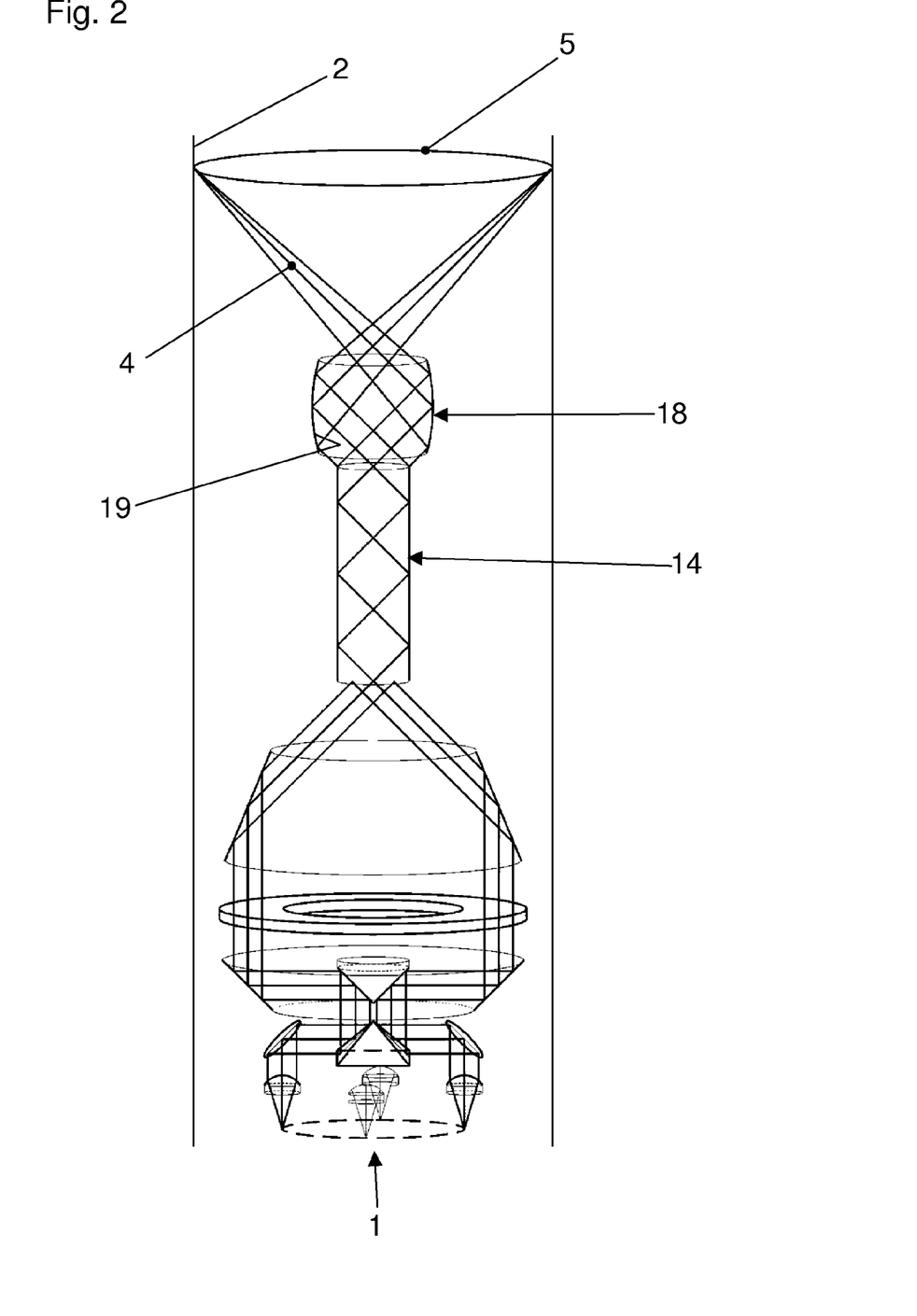
FIG. 2 a schematic side view of a second embodiment of a device according to the invention.

The second embodiment shown in FIG. 2 differs from the first embodiment shown in FIG. 1 in that a mirror means 18 also operating as a focusing means is employed instead of the lens means 16. The mirror means 18 is constructed in particular as a toroidal mirror means 18, so that the toroidal mirror means 18 also produces a circular focus area 5 on the inner surface 2 of the cylinder 3. In this case, the toroidal mirror means 18 has a reflective toroidal inner surface 19, by which the light 4 is reflected onto the inner surface 2 of the cylinder 3.

Figure 10:
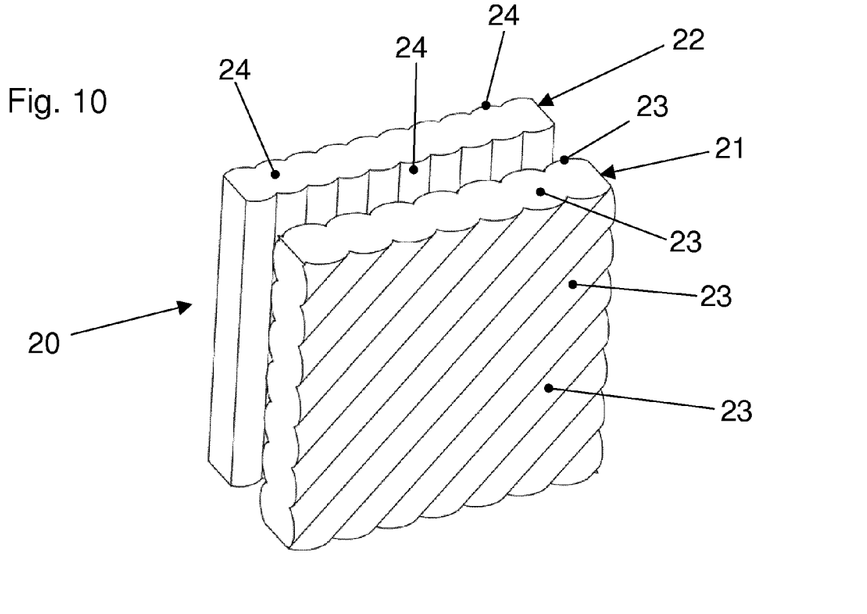
FIG. 10 a perspective view of a second embodiment of a beam transformation device according to the invention.
Figure 11:
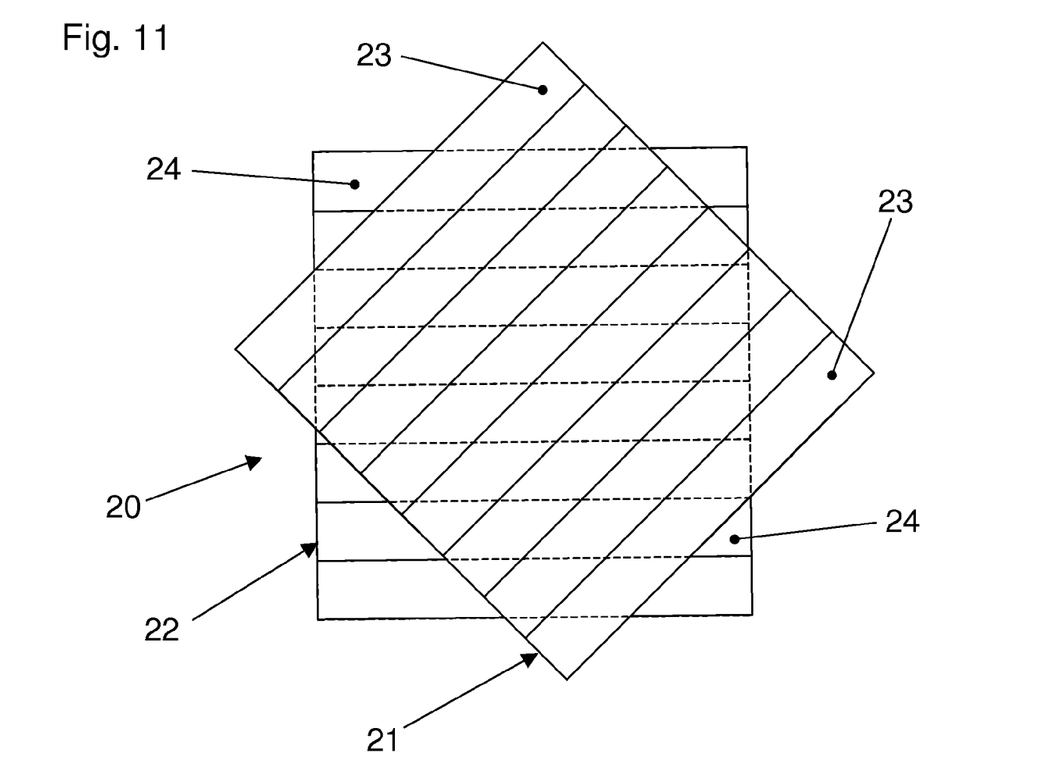
FIG. 11 a schematic side view of the second embodiment of a beam transformation device according to the invention.

FIG. 10 and FIG. 11 show a second embodiment of a beam transformation device 20 according to the invention. This second embodiment includes two consecutively arranged cylindrical lens arrays 21, 22, wherein the cylinder axes of the cylindrical lenses 23, 24 of these cylindrical lens arrays 21, 22 enclose an angle of 45° with one another.

Also in this embodiment, the individual cylindrical lenses 23, 24 are each formed for example as biconvex lenses with a convex surface on the entrance side and a convex surface on the exit side of the beam transformation device 20. The mutual distance between these two convex surfaces to each other corresponds in particular to the sum of the focal lengths of these two convex surfaces or to twice the focal length of the convex surfaces if the focal lengths are equal. Each of the cylindrical lenses 23, 24 forms hereby a Kepler telescope.

Figure 12:
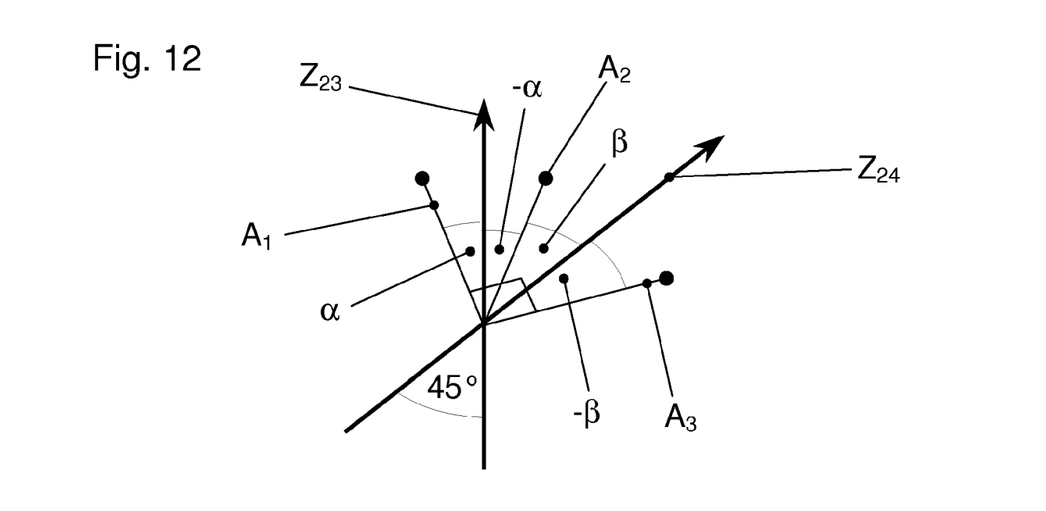
FIG. 12 an illustration of the effect of the second embodiment of a beam transformation device according to the invention.

In FIG. 12, the azimuth angle of an incident light beam is denoted by $A_1$, and the azimuth angle of the exiting light beam by $A_3$. $A_2$ indicates the azimuth angle of the light beam after exiting from the first cylindrical lens array 21. Furthermore, FIG. 12 shows the directions $Z_{23}$ and $Z_{24}$ of the cylinder axes of the cylindrical lenses 23, 24 of the cylindrical lens arrays 21, 22. These enclose an angle of 45° with each other.

FIG. 12 illustrates how the azimuth angle of a light beam passing through the beam transformation device 20 is rotated by the two cylindrical lens arrays 21, 22 together by 90°. In this case, the angle α between the azimuth angle $A_1$ and the direction $Z_{23}$ is transformed by the first cylindrical lens array 21 by an angle -α. Thereafter, the angle β between the azimuth angle $A_2$ and the direction $Z_{24}$ is transformed by the second cylindrical lens array 22 by an angle -β.

Accordingly, due to the angle of 45° between the directions of $Z_{23}$ and $Z_{24}$ of the cylinder axes of the cylindrical lenses 23, 24, the azimuth angle of the light beam passing through the beam transformation device 20 is rotated by 90°.

Figure 13:
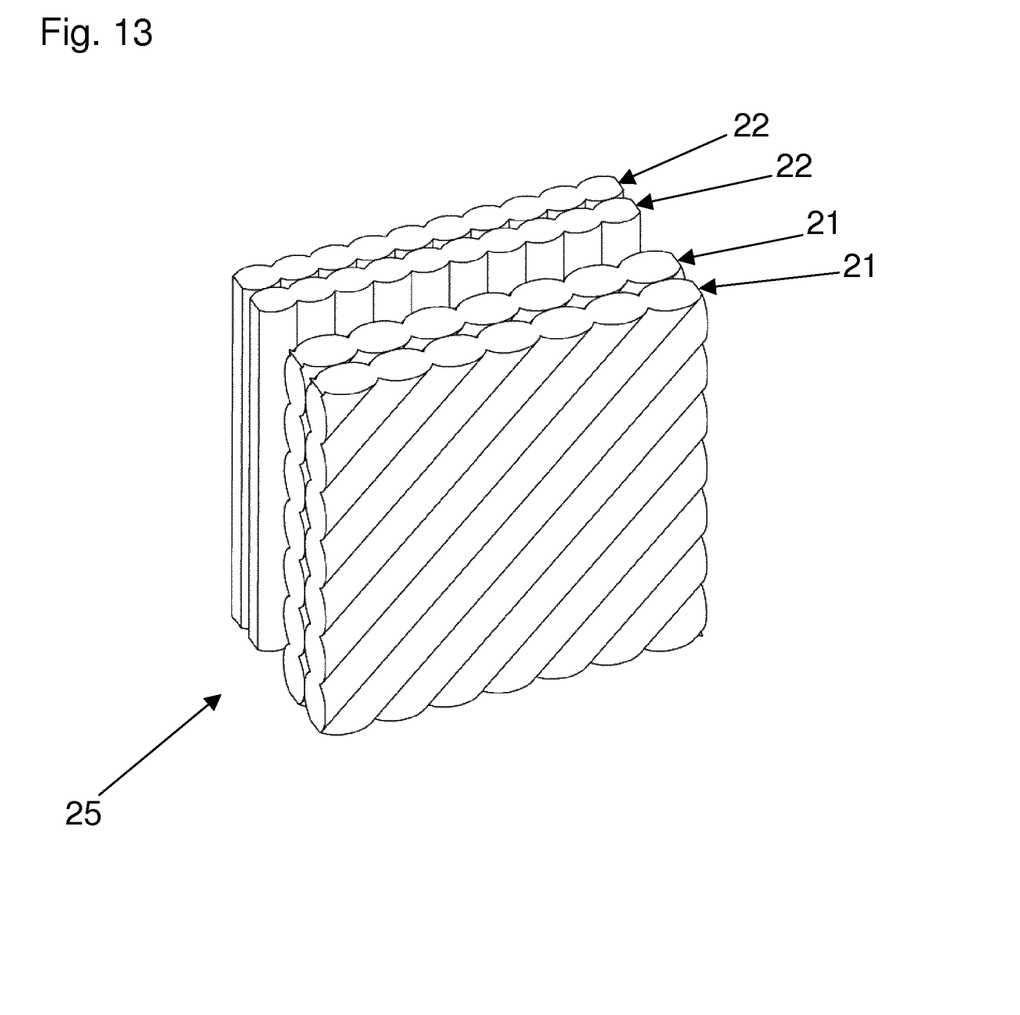
FIG. 13 a schematic side view of a third embodiment of a beam transformation device according to the invention.
Figure 14:
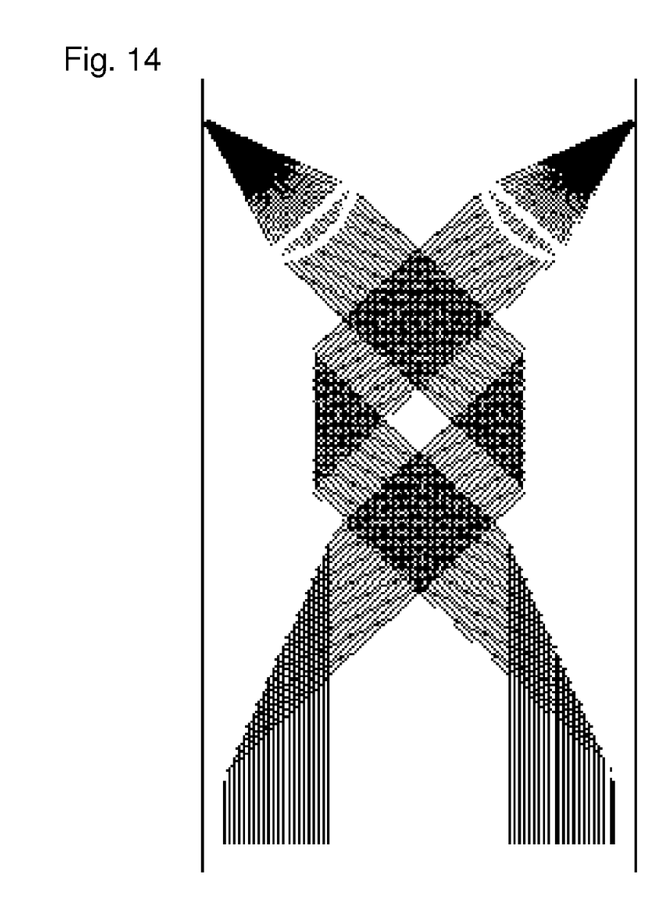
FIG. 14 a schematic side view of the optical paths of the light in the upper region of a device according to the invention using three light sources.
Figure 15:
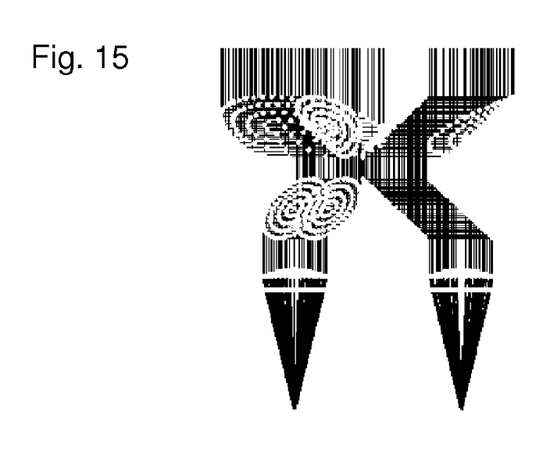
FIG. 15 a schematic side view corresponding to FIG. 14 of the optical paths of the light in the lower region of the device.
Figure 16:
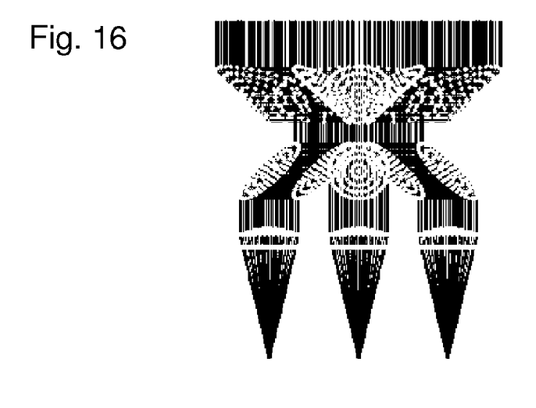
FIG. 16 a schematic side view of the optical paths of the light in the lower region of the device corresponding to FIG. 14, rotated by 90° with respect to FIG. 15.

FIG. 13 shows another embodiment of a beam transformation device 25, which is constructed similar to the beam transformation device 20 shown in FIG. 10 and FIG. 11, but includes four instead of two cylindrical lens arrays. In particular, two first cylindrical lens array 21 and two second cylindrical lens arrays 22, which are arranged consecutively in the propagation direction of the light, are provided in the beam transformation device 25.

The invention claimed is:
1. A beam transformation device (12), comprising:
a plurality of cylindrical lens arrays, arranged annularly adjacent to one another and each comprise respective cylindrical lenses having cylinder axes (Z) oriented at an angle (γ) of 45° with respect to the radial direction (R) of the annular arrangement.

\* \* \* \* \*

UNITED STATES PATENT AND TRADEMARK OFFICE
CERTIFICATE OF CORRECTION

PATENT NO. : 9,798,047 B2
APPLICATION NO. : 14/436589
DATED : October 24, 2017
INVENTOR(S) : Mikhailov et al.

It is certified that error appears in the above-identified patent and that said Letters Patent is hereby corrected as shown below:

On the Title Page

Below Abstract, delete "1 Claim, 10 Drawing Sheets" and insert --11 Claims, 10 Drawing Sheets--

In the Claims

Column 6, following Claim 1, add the following additional claims:

--2. A device (1) for applying light (4) to an inner surface (2) of a cylinder (3), comprising homogenizer (14), into which the light (4) enters and from which the light (4) exits again, wherein the homogenizer (14) has a cylindrical inner surface (15), at which the light (4) reflects after entering and before exiting,
arrangement for introducing light (4) into the homogenizer (14),
focusing arrangement configured to focus light (4) exiting the homogenizer (14) onto the inner surface (2) of the cylinder (3) to which the light (4) is to be applied,
a beam transformation device (12, 20, 25) arranged upstream of the homogenizer (14), so that light (4) that has passed through the beam transformation device (12, 20, 25) enters into the homogenizer (14), wherein the beam transformation device (12, 20, 25) is a beam transformation device (12, 20, 25) according to claim 1.

3. The device according to claim 2, wherein the homogenizer (14) are formed as a hollow cylinder, whereby in particular the inner jacket surface of the hollow cylinder is designed to be reflective.

4. The device according to claim 3, wherein the inner jacket surface of the hollow cylinder is patterned.

5. The device according to claim 4, wherein the patterning is arranged on the inner jacket surface as a reflective array of hollow cylinder section.

Signed and Sealed this
Twenty-fifth Day of September, 2018

Andrei Iancu
*Director of the United States Patent and Trademark Office*

CERTIFICATE OF CORRECTION (continued)
U.S. Pat. No. 9,798,047 B2

6. The device according to claim 2, wherein the focusing arrangement are formed as lens arrangements (16).

7. The device according to claim 2, wherein the device comprises beam expanding arrangements, which expand and/or shape the light (4) prior to entering the beam transformation device (12, 20, 25) and/or the homogenizer (14) so that the beam cross-section of the light (4) has off-center an intensity maximum or several intensity maxima.

8. The device according to claim 6, wherein the lens arrangements (16) is formed as toroidal lens arrangements.

9. The device according to claim 6, wherein the lens arrangements (16) is formed as mirror arrangement (18).

10. The device according to claim 6, wherein the mirror arrangement (16) comprises toroidal mirrors (18).

11. The device according to claim 6, wherein the mirror arrangement (16), comprising toroidal mirror arrangements (18).--